(12) United States Patent
Abe et al.

(10) Patent No.: US 7,900,595 B2
(45) Date of Patent: Mar. 8, 2011

(54) INTAKE PORT STRUCTURE FOR INTERNAL COMBUSTION ENGINE

(75) Inventors: Kazuyoshi Abe, Susono (JP); Shinya Wakabayashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 514 days.

(21) Appl. No.: 11/991,530

(22) PCT Filed: Sep. 7, 2006

(86) PCT No.: PCT/IB2006/002463
§ 371 (c)(1),
(2), (4) Date: Mar. 6, 2008

(87) PCT Pub. No.: WO2007/029104
PCT Pub. Date: Mar. 15, 2007

(65) Prior Publication Data
US 2009/0120400 A1    May 14, 2009

(30) Foreign Application Priority Data
Sep. 8, 2005  (JP) .................... 2005-261338

(51) Int. Cl.
*F02B 31/00* (2006.01)
*F02B 31/06* (2006.01)

(52) U.S. Cl. ........................................ 123/306

(58) Field of Classification Search .................. 123/306, 123/308, 432, 188.14, 184.21, 184.54
See application file for complete search history.

(56) References Cited

U.S. PATENT DOCUMENTS

| 4,300,500 A * | 11/1981 | Motosugi et al. ............. 123/308 |
| 4,577,602 A | 3/1986 | Showalter |
| 7,156,071 B2 * | 1/2007 | Abe et al. ...................... 123/306 |
| 2005/0155570 A1* | 7/2005 | Confer et al. ................. 123/306 |
| 2007/0246009 A1* | 10/2007 | Suzuki et al. ................. 123/336 |

FOREIGN PATENT DOCUMENTS

| AT | 500 408 A1 | 12/2005 |
| DE | 198 30 859 A1 | 3/2000 |
| EP | 0 514 854 A2 | 11/1992 |
| EP | 0 590 704 A2 | 4/1994 |
| GB | 2 245 932 A | 1/1992 |
| JP | 59-135334 U | 9/1984 |
| JP | 05-086872 A | 4/1993 |
| JP | 06-248956 | 9/1994 |
| JP | 7-25264 U | 5/1995 |
| JP | 07-174028 A | 7/1995 |
| JP | 7-42407 | 8/1995 |
| JP | 07-293257 A | 11/1995 |
| JP | 09-222063 A | 8/1997 |
| JP | 09-303163 A | 11/1997 |
| JP | 2003-106158 A | 4/2003 |
| JP | 2003-293778 A | 10/2003 |
| JP | 2005-256779 A | 9/2005 |
| JP | 2006-291797 A | 10/2006 |

* cited by examiner

Primary Examiner — Mahmoud Gimie
(74) *Attorney, Agent, or Firm* — Kenyon & Kenyon LLP

(57) ABSTRACT

An intake port structure for an internal combustion engine according to the invention includes a valve shaft provided in an intake port; and an airflow control valve that is supported by the valve shaft at one end of the airflow control valve or at a position near the one end. A gap is formed between the airflow control valve and a wall surface of the intake port, which is positioned on one side of the valve shaft. Because intake airflow passes through the gap that is formed, the generation of a deposit is suppressed, and the locking of the airflow control valve is avoided.

9 Claims, 9 Drawing Sheets

INTAKE PORT STRUCTURE FOR INTERNAL COMBUSTION ENGINE

This is a 371 national phase application of PCT/IB2006/002463 filed 7 Sep. 2006, claiming priority to Japanese Patent Application No. 2005-261338 filed 8 Sep. 2005, the contents of which are incorporated herein by reference.

BACKGROUND OF THE INVENTION

1. Field of the Invention

The invention relates to an intake port structure for an internal combustion engine. More particularly, the invention relates to an intake port structure for an internal combustion engine, which avoids the locking of an airflow control valve, which increases the strength of a swirling airflow generated in a combustion chamber, and which suppresses the deterioration of fuel efficiency and reduces emissions.

2. Description of the Related Art

As a technology related to the invention, an intake port structure for an internal combustion engine is known. In the intake port structure, an airflow control valve provided in an intake port is controlled to be opened/closed to control the flow of intake air, and to generate a swirling flow such as a tumble flow and a swirl in a combustion chamber. The swirling airflow, such as the tumble flow and the swirl, promotes the mixing of fuel and air, and the transmission of flame to improve combustion efficiency. Also, the swirling airflow brings rich air-fuel mixture near to an ignition plug to enable stratified charge combustion. Japanese Utility Model Application Publication No. 7-25264 (Patent Publication 1) describes an airflow control valve (shutter valve) used to generate the swirling airflow.

In the technology described in Patent Publication 1, the airflow control valve is provided on the wall surface of the passage of an intake port. In the intake port, a first passage and a second passage are formed by providing a partition wall. Intake air is guided to the center portion of the space inside a combustion chamber through the first passage so that the tumble flow is generated. The intake air is guided to the outer peripheral portion of the space inside the combustion chamber through the second passage. One end of the airflow control valve is supported by a shaft so that the airflow control valve can pivot. When the airflow control valve is partly opened, the other end of the airflow control valve contacts the end portion of the partition wall. As a result, the entire cross sectional area of the second passage is closed. When the airflow control valve closes the entire cross sectional area of the second passage, the intake air flows into the combustion chamber through the first passage, and the tumble flow is generated. By partly opening the airflow control valve, the strong tumble flow is generated in the combustion chamber. By completely closing or completely opening the airflow control valve, the flow amount of intake air can be controlled.

Figure 9A:
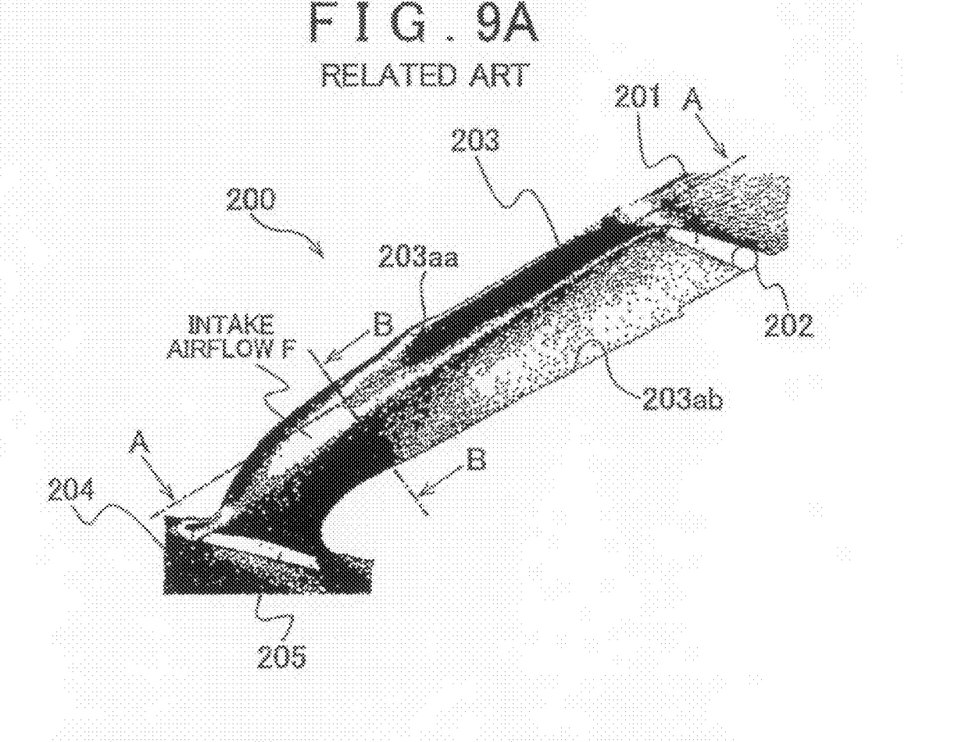
FIG. 9A to FIG. 9C show an intake port structure 200 that includes an airflow control valve 201 whose one end is supported by a valve shaft 202 provided near a wall surface 203*ab* of an intake port 203.
Figure 9B:
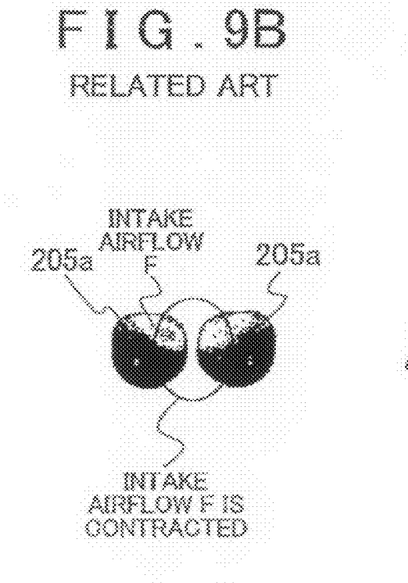
Figure 9C:
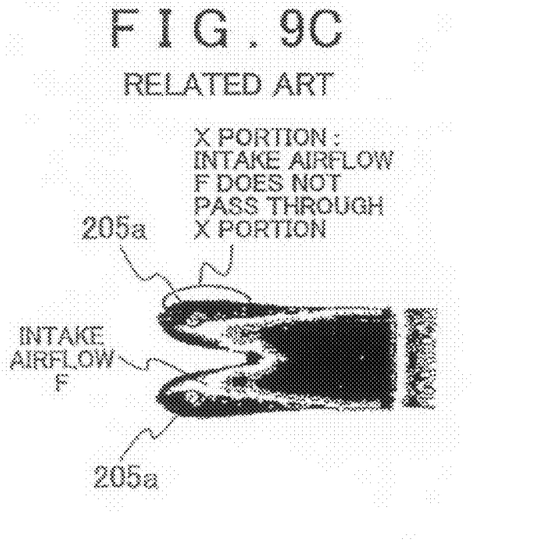

In the intake port structure that includes the airflow control valve whose one end is supported by the valve shaft, the intake airflow moves in the intake port as described below. FIG. 9A to FIG. 9C show an intake port structure 200 that includes an airflow control valve 201 whose one end is supported by a valve shaft 202. The valve shaft 202 is provided at a position near the wall surface 203*ab* of the intake port 203 in the side view of the intake port 203. More specifically, FIG. 9A shows the distribution of the flow speed of an intake airflow F in the intake port 203 when intake air flows into the intake port structure 200. FIG. 9B is a sectional view of the intake port 203 shown in FIG. 9A, taken along line B-B. FIG. 9C is a sectional view of the intake port 203 shown in FIG. 9A, taken along line A-A.

When the intake air flows into the intake port structure 200 shown in FIG. 9A, immediately after the intake airflow F passes through a passage E that has been made narrow, the intake airflow F is deflected toward a wall surface 203*aa*, and accordingly, the flow speed of the intake air is increased. However, as the deflected intake airflow F approaches a combustion chamber 204, the intake airflow F is gradually diffused from the wall surface 203*aa* toward a wall surface 203*ab*. Accordingly, the flow speed of the intake air is decreased. This reduces the strength of the swirling airflow generated in the combustion chamber 204 based on the intake airflow F.

Japanese Patent Application Publication No. JP-A-6-248956 (Latent Publication 2) describes an engine intake apparatus to solve the above-described problem. The engine intake apparatus is applied to an internal combustion engine in which an intake airflow (air-fuel mixture airflow) is guided to the outer bent portion of an intake port so that a strong tumble flow can be generated in a combustion chamber. The engine intake apparatus includes a sub-port. One end of the sub-port is connected to the inner bent portion of the intake port at a position immediately upstream of an intake valve so as to inject assist air in the direction opposite to the direction of the intake airflow passing through the intake port. The other end of the sub-port is connected to an intake passage at a position upstream of a throttle valve. Air is sucked into the sub-port from the intake passage at the position upstream of the throttle valve due to the difference between the pressure in the intake port and the pressure in the intake passage at the position upstream of the throttle valve. Further, the sucked air serves as the assist air, and deflects the intake airflow toward the outer bent portion of the intake port. In this technology, the stronger tumble flow can be generated in the combustion chamber using the deflected intake airflow.

Japanese Utility Model Application Publication No. 7-42407 (Patent Publication 3) describes an engine intake apparatus. Like the engine intake apparatus described in Patent Publication 2, this engine intake apparatus is also applied to an internal combustion engine in which an intake airflow (air-fuel mixture airflow) is deflected to the outer bent portion of an intake port so that a strong tumble flow can be generated in the combustion chamber. Also, the engine intake apparatus includes a tumble port (sub-port). One end of the tumble port is connected to the inner bent portion of the intake port at a position upstream of an intake valve. The other end of the tumble port is connected to an intake passage at a position upstream of a throttle valve. Further, the tumble port of the engine intake apparatus is formed such that the inner bent portion of the tumble port is inclined at 135 degrees with respect to the direction in which the intake air flows. In this technology, the intake airflow is outwardly deflected by assist air injected from the tumble port. Thus, the stronger tumble flow can be generated in the combustion chamber.

When the airflow control valve described in Patent Publication 1 is partly opened, an engulfing flow is generated in the intake port, and is directed toward the space between the lower surface of the airflow control valve (i.e., the lower surface in the direction of the intake airflow) and the wall surface of the intake port. The intake airflow contains, for example, a small amount of oil and carbon, and powder dust. Oil and carbon flow from a PCV (Positive Crankcase Ventilation System), an intake manifold, and the like that are provided upstream of the intake port. The powder dust is contained in atmospheric air. Therefore, the oil adheres to the lower surface of the airflow control valve and the wall surface of the intake port due to the engulfing airflow directed toward the above-described space. Also, the carbon and the powder dust are deposited, and a deposit is generated. The pivot movement of the airflow control valve is adversely affected by the deposit thus generated. Further, the airflow control valve may be locked due to the deposit.

In the intake port structure 200 shown in FIG. 9A, the intake airflow F is contracted in the area between the stems 205a of an intake valve 205, as shown in FIG. 9B that is a sectional view of the intake port 203 taken along line B-B in FIG. 9A. Further, as shown in FIG. 9C that is a sectional view of the intake port 203 taken along line A-A in FIG. 9A, the intake airflow F passes through the area between the stems 205a of an intake valve 205, and the intake airflow F hardly passes through an X portion. In such a situation, if the fuel adheres to the X portion of the intake valve 205, the fuel keeps adhering to the X portion, because the intake airflow P hardly passes through the X portion. The fuel efficiency of the internal combustion engine deteriorates, and the air-fuel ratio of the air-fuel mixture changes due to the fuel adhering to the X portion. As a result, emissions contained in exhaust gas, such as CO and HC, may increase. However, in Patent Publication 1, no consideration is given to the problem that the airflow control valve may be locked, and the problem that the fuel efficiency of the internal combustion engine may deteriorate, and the emissions may increase due to the oil adhering to the airflow control valve.

The engine intake apparatuses described in Patent Publications 2 and 3 can increase the strength of the generated tumble flow by deflecting the intake airflow, as compared to the airflow control valve described in Patent Publication 1. However, because the assist air is injected in the direction opposite to the direction of the intake airflow, the intake airflow may be attenuated, and accordingly, the strength of the generated tumble flow may be reduced.

SUMMARY OF THE INVENTION

In view of the above, it is an object of the invention to provide an intake port structure for an internal combustion engine, which avoids the locking of an airflow control valve, which increases the strength of a swirling airflow generated in a combustion chamber, and which suppresses the deterioration of fuel efficiency and reduces emissions.

According to the invention, an intake port structure for an internal combustion engine includes a valve shaft, and an airflow control valve. The valve shaft is provided in an intake port. The airflow control valve is supported by the valve shaft at one end of the airflow control valve or at a position near the one end A gap is formed between the airflow control valve and a wall surface of the intake port.

The intake port structure according to the invention includes the airflow control valve that is supported by the valve shaft at the position near one end of the airflow control valve. In this intake port structure, intake air flows through the gap. Thus, the intake air passing through the gap contacts the lower surface of the airflow control valve and the wall surface of the intake port, and removes the oil and carbon adhering to the lower surface of the airflow control valve and the wall surface of the intake port. This suppresses the generation of a deposit. As a result, the locking of the airflow control valve can be avoided.

In the case where the valve shaft is provided at the position near the bottom portion of the wall surface of the intake port in the side view of the intake port, a clearance is generally formed between the valve shaft and a portion of the wall surface of the intake port, which is near the valve shaft. This clearance is necessary for pivoting the airflow control valve. That is, this clearance and the gap according to the invention are formed based on different technical ideas. In contrast with this clearance, the gap is formed so that the intake air flows through the gap in the intake port structure according to the invention. Further, for example, even when the airflow control valve is completely opened, the gap is formed so that the intake air is more effectively guided to the gap. Thus, the generation of the deposit is suppressed.

According to the invention, an intake port structure for an internal combustion engine includes a valve shaft and an airflow control valve. The valve is provided in an intake port. The airflow control valve is supported by the valve shaft. When the airflow control valve is opened, a passage is formed between the airflow control valve and a portion of the wall surface of the intake port, which is positioned on one side of the valve shaft. A gap is formed between the airflow control valve and another portion of the wall surface of the intake port, which is opposite to the portion of the wall surface adjacent to the passage, according to the opening amount of the airflow control valve.

The phrase "when the airflow control valve is opened, a passage is formed between the airflow control valve and a portion of the wall surface of the intake port, which is positioned on one side of the valve shaft" signifies that a butterfly-type airflow control valve is excluded. When the butterfly-type airflow control valve is partly opened, two passages are formed between the airflow control valve and opposite portions of the wall surface of the intake port. That is, two passages are formed on both sides of the valve shaft. According to the invention, in the intake port structure in which a passage is formed on one side of the valve shaft when the airflow control valve is opened, the generation of the deposit can be suppressed and the locking of the airflow control valve can be avoided by using the intake airflow passing through the gap. Also, according to the invention, it is possible to determine the range of the opening amount of the airflow control valve in which the gap is formed, considering the influence of the intake airflow passing through the gap in the various situations that occur based on the opening amount of the airflow control valve.

Also, according to the invention, the gap may be formed when the opening amount of the airflow control valve is larger than or equal to a predetermined amount, and the gap may be closed when the opening amount of the airflow control valve is smaller than the predetermined amount. For example, the gap may be closed when the airflow control valve is partly opened such that the opening amount is smaller than the predetermined amount, or when the airflow control valve is completely closed. In this case, the intake airflow passing through the passage in the intake port is prevented from being attenuated due to the intake air passing through the gap when the airflow control valve is partly opened such that the opening amount is smaller than the predetermined amount, or when the airflow control valve is completely closed. This suppresses a decrease in the strength of the swirling airflow generated in the combustion chamber. Also, the gap may be formed when the airflow control valve is partly opened such that the opening amount is larger than or equal to the predetermined amount, or when the airflow control valve is completely opened. That is, the gap may be formed when the flow amount and the flow speed of intake air increase. In this case, it is possible to suppress a decrease in an intake-air charging efficiency in the internal combustion engine due to the influence of the intake air passing through the gap. According to the invention, the generation of the deposit can be suppressed and the locking of the airflow control valve can be avoided by the intake airflow passing through the gap. Further, it is possible to suppress a decrease in the strength of the swirling airflow and a decrease in the intake-air charging efficiency, considering the influence of the intake airflow passing through the gap on the intake airflow passing through the passage in the intake port.

According to the invention, the gap may be closed when the opening amount of the airflow control valve is larger than or equal to a predetermined amount, and the gap may be formed when the opening amount of the airflow control valve is smaller than the predetermined amount. According to the invention, by forming the gap in the above-described manner, the generation of the deposit can be suppressed and the locking of the airflow control valve can be avoided.

According to the invention, the gap may be formed when the opening amount of the airflow control valve is in a predetermined range. According to the invention, by forming the gap when the opening amount of the airflow control valve is in the predetermined range, the generation of the deposit can be suppressed and the locking of the airflow control valve can be avoided.

Also, according to the invention, the end portion of the airflow control valve may be formed such that the cross sectional area of a portion of the gap at an upstream position in a direction in which intake air flows is larger than the cross sectional area of a portion of the gap at a downstream position in the direction. According to the invention, the intake air can be appropriately guided to the gap. The generation of the deposit can be suppressed, and the locking of the airflow control valve can be avoided.

According to the invention, an airflow guide portion may be provided on the portion of the wall surface adjacent to the gap, at a position downstream of the airflow control valve. In this case, the airflow guide portion guides intake air, which has passed through the gap, toward the portion of the wall surface adjacent to the passage.

According to the invention, the intake air, which is guided by the airflow guide portion, pushes the deflected intake airflow upward. This suppresses the diffusion of the deflected intake airflow and a decrease in the flow speed of the intake air. Also, the attenuation of the intake airflow is more appropriately suppressed, as compared to the case where assist air is injected in the direction opposite to the direction of the intake airflow. As a result, the intake airflow is kept deflected more appropriately. Thus, it is possible to increase the strength of the swirling airflow generated in the combustion chamber. Further, the contraction of the deflected intake airflow is suppressed by the intake air guided by the airflow guide portion. This suppresses the adherence of fuel to the intake valve. As a result, the deterioration of the fuel efficiency in the internal combustion engine is suppressed, and the emissions are reduced.

According to the invention, an intake port structure for an internal combustion engine includes a valve shaft, and an airflow control valve. The valve shaft is provided in an intake port. The airflow control valve is supported by the valve shaft at one end of the airflow control valve. When the airflow control valve is opened, a passage is formed between the airflow control valve and a portion of the wall surface of the intake port, which is positioned on one side of the valve shaft. One end of the airflow control valve contacts another portion of the wall surface of the intake port, which is opposite to the portion of the wall surface adjacent to the passage. A hole, through which intake air passes, is formed in the airflow control valve.

According to the invention, an airflow guide portion may be provided on the portion of the wall surface, which is opposite to the portion of the wall surface adjacent to the passage, at a position downstream of the airflow control valve. In this case, the airflow guide portion guides the intake air, which has passed through the hole, toward the portion of the wall surface adjacent to the passage.

According to the invention, it is possible to provide the intake port structure for an internal combustion engine, which avoids the locking of the airflow control valve, which increases the strength of the swirling airflow generated in the combustion chamber, and which suppresses the deterioration of fuel efficiency, and reduces the emissions.

BRIEF DESCRIPTION OF THE DRAWINGS

The foregoing and/or further objects, features and advantages of the invention will become more apparent from the following description of example embodiment with reference to the accompanying drawings, in which like numerals are used to represent like elements and wherein.

DETAILED DESCRIPTION OF THE EXAMPLE EMBODIMENTS

In the following description, the present invention will be described in more detail in terms of example embodiments.

Figure 1A:
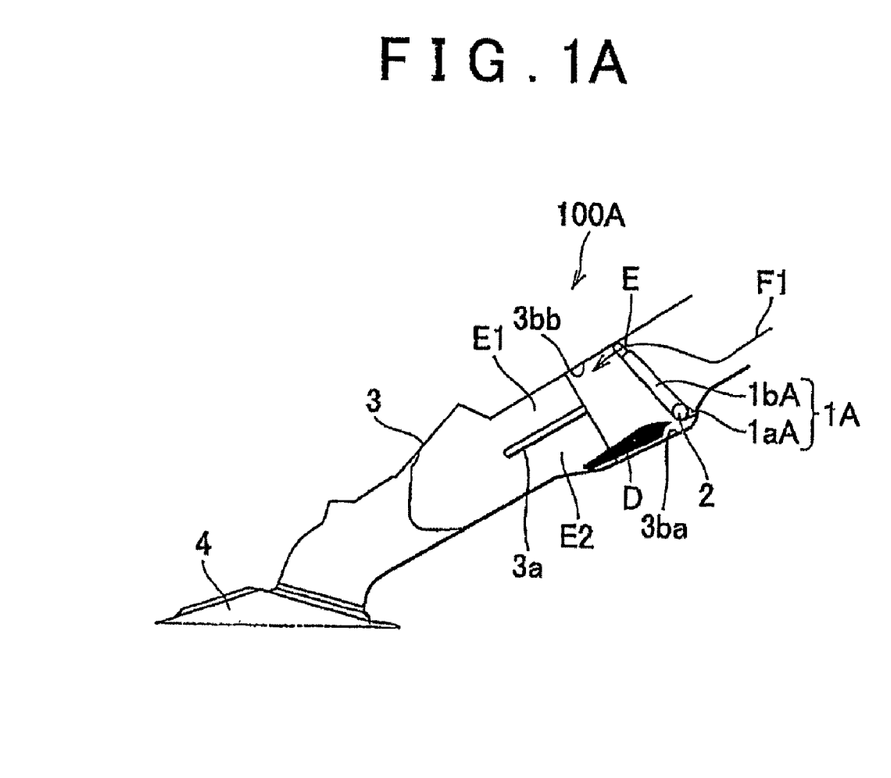
FIG. 1A to FIG. 1F show the configuration of an intake port structure 100A for an internal combustion engine according to a first embodiment.
Figure 1B:
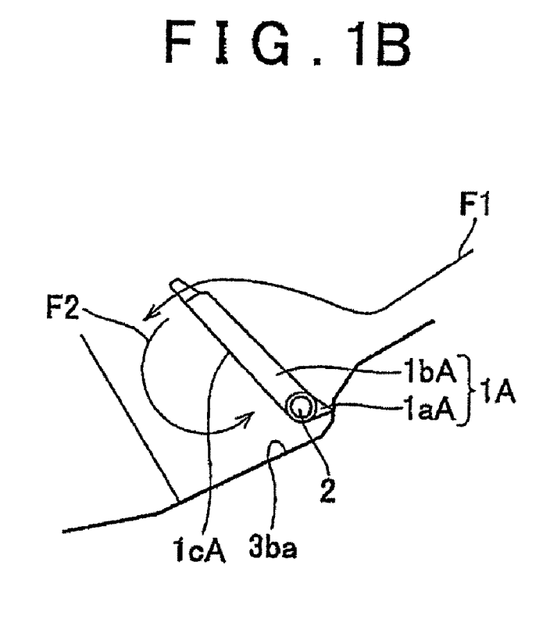
Figure 1C:
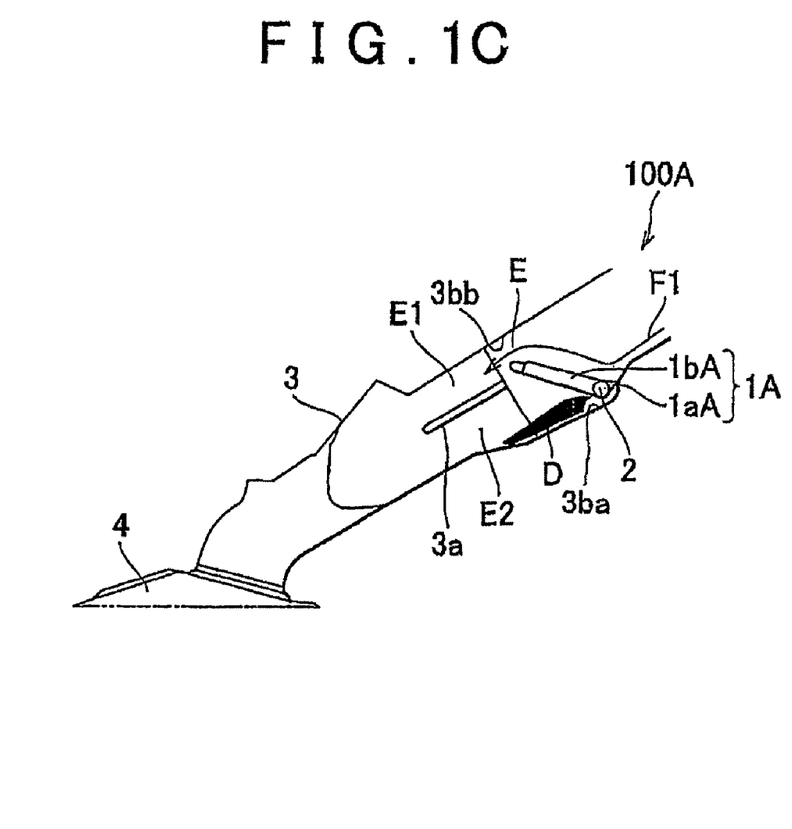
Figure 1D:
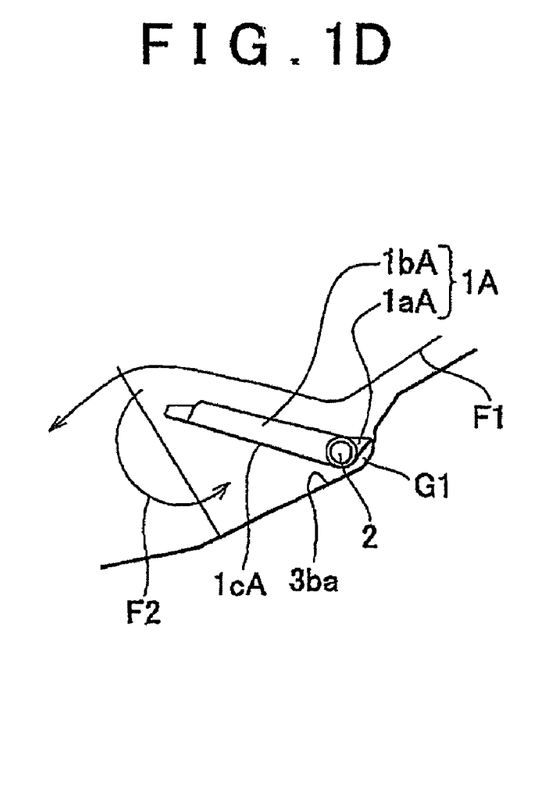
Figure 1E:
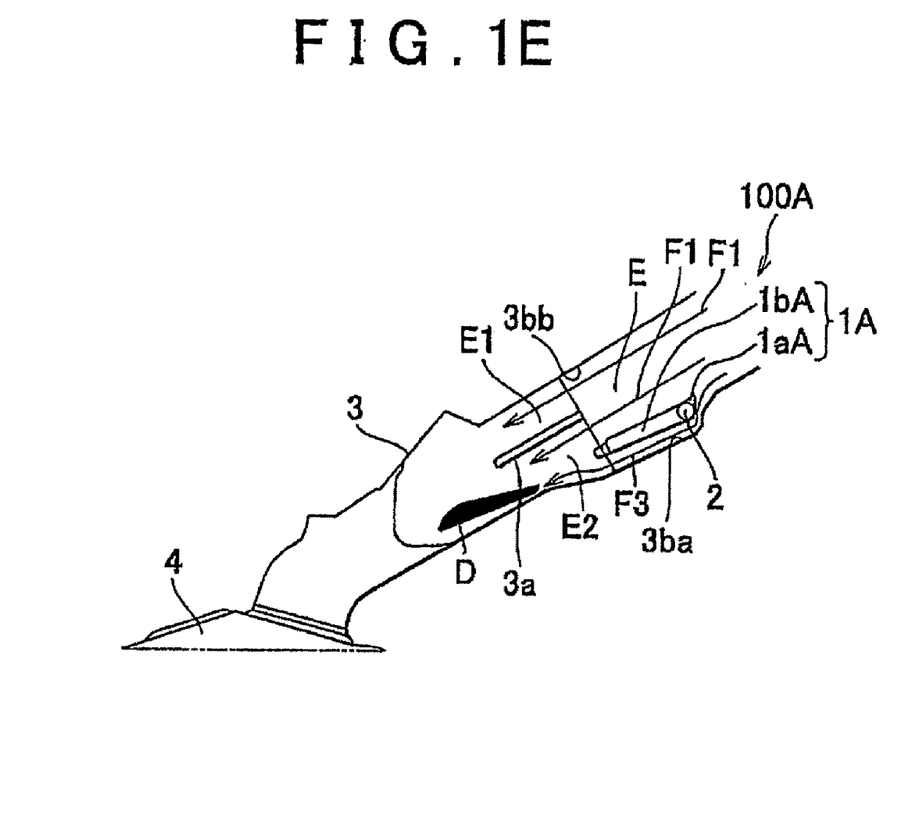
Figure 1F:
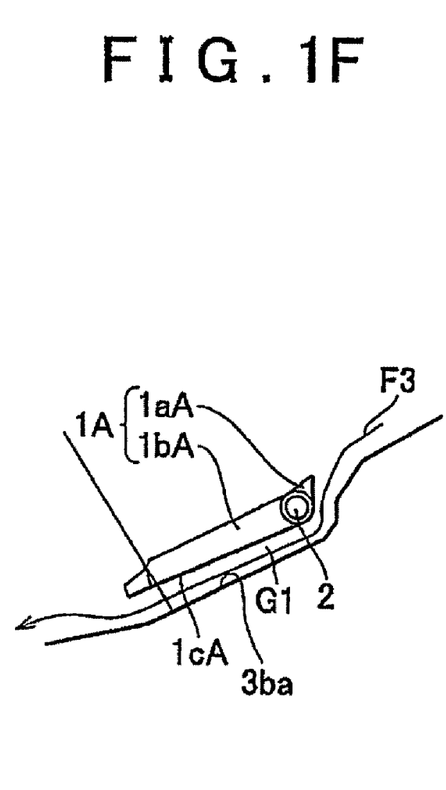

An intake port structure 10A according to a first embodiment of the invention will be described in detail with reference to FIG. 1A to FIG. 1F. FIG. 1A to FIG. 1F show the configuration of an intake port structure for an internal combustion engine (hereinafter, referred to simply as "intake port structure") 100A according to this embodiment. More specifically, FIG. 1A shows that an airflow control valve 1A is completely closed. FIG. 1B is an enlarged view showing that the gap between the airflow control valve 1A and the wall surface 3ba of an intake port 3 is closed when the airflow control valve 1A is completely closed. FIG. 1C shows that the airflow control valve 1A is partly opened. FIG. 1D is an enlarged view showing that the gap between the airflow control valve 1A and the wall surface 3ba is closed when the airflow control valve 1A is partly opened. FIG. 1E shows that the airflow control valve 1A is completely opened. FIG. 1F is an enlarged view showing that the gap G1 is formed between the airflow control valve 1A and the wall surface 3ba when the airflow control valve 1A is completely opened.

The intake port structure 100A according to this embodiment is applied to an internal combustion engine (not shown) in which an intake airflow F1 is deflected toward the wall surface 3bb of the intake port 3 so that a strong tumble flow can be generated in a combustion chamber 4. As shown in FIG. 1A, the intake port structure 100A according to this embodiment includes the airflow control valve 1A, a valve shaft 2, and the intake port 3. Intake air is guided to a combustion chamber 4 through the intake port 3. In this embodiment, a partition wall 3a is formed in the intake port 3. The partition wall 3a divides the space in the intake port 3 into two passages E1 and E2. However, the intake port 3 may not include the partition wall 3a. The wall surface 3ba of the intake port 3 is formed such that the airflow control valve 1A can be housed in the intake port 3, and the airflow control valve 1A does not interfere with the intake airflow when the airflow control valve 1A is opened. When the airflow control valve 1A is partly opened, intake air is guided to the combustion chamber 4 through the passage E1 so that the tumble flow is generated in the combustion chamber 4. When the airflow control valve 1A is completely opened, intake air is guided to the combustion chamber 4 through the passages E1 and E2.

The valve shaft 2 supports the airflow control valve 1A such that the airflow control valve 1A can pivot. As shown in FIG. 1A, in this embodiment, the valve shaft 2 is provided at a position near the wall surface 3ba in the side view of the intake port 3. The valve shaft 2 supports the airflow control valve 1A at a position near one end portion of the airflow control valve 1A. The airflow control valve 1A controls the flow amount and flow speed of intake air. The airflow control valve 1A includes a gap opening/closing portion 1aA and a valve element portion 1bA. The gap opening/closing portion 1aA is provided on one side of the valve shaft 2. The valve element portion 1bA is provided on the other side of the valve shaft 2. The gap opening/closing portion 1aA opens/closes the gap G1 formed between the valve shaft 2 and the wall surface 3ba. A passage E is formed between the valve element portion 1bA and the wall surface 3bb so that the intake air is guided to the passage E.

The valve shaft 2 is driven by an actuator (not shown). As the actuator, for example, an electric motor may be employed. The actuator can be controlled by a control portion (not shown). As the control portion, for example, an ECU (electronic control unit) may be employed. When the actuator, which is driven by the control portion, changes the opening amount of the airflow control valve 1A via the valve shaft 2, the flow amount and the flow speed of the intake air flowing in the passage E are changed.

Next, a case where the airflow control valve 1A is completely closed, a case where the airflow control valve 1A is partly opened, and a case where the airflow control valve 1A is completely opened in the above-described configuration will be described in detail. As shown in FIG. 1B, when the airflow control valve 1A is completely closed, the gap opening/closing portion 1aA closes the gap between the valve shaft 2 and the wall surface 3ba. The valve element portion 1bA partially closes the space in the intake port 3 so that the narrow passage E is formed between the valve element portion 1bA and the wall surface 3bb. Because the intake airflow F1 passes through the narrow passage E, the speed of the intake airflow F1 is increased, and the intake airflow F1 is deflected. Thus, the tumble flow is generated in the combustion chamber 4.

As shown in FIG. 1C, when the airflow control valve 1A is partly opened, the passage E is enlarged to increase the flow amount of intake air. As shown in FIG. 1D, when the airflow control valve 1A is partly opened such that the opening amount is smaller than a predetermined amount, the gap opening/closing portion 1aA still closes the gap G1. In this embodiment, when the airflow control valve 1A is completely closed, or when the airflow control valve 1A is partly opened such that the opening amount is smaller than the predetermined amount, the gap G1 is closed so that the intake air does not flow through the gap G1. This avoids the situation where the intake airflow F1 passing through the passage E is attenuated by the influence of the intake air passing through the gap G1. Thus, when the airflow control valve 1A is partly opened such that the opening amount is smaller than the predetermined amount, the flow amount of intake air is increased, and the tumble flow continues to be generated while suppressing the attenuation of the tumble flow.

As shown in FIG. 1E, when the airflow control valve 1A is completely opened, the airflow control valve 1A enlarges the passage B to the fullest extent so that the airflow F1 is guided to the combustion chamber 4 through the enlarged passage E. Thus, the flow amount of intake air can be increased when a high load is applied to the internal combustion engine and the engine speed is high. Also, in this embodiment, when the airflow control valve 1A is partly opened such that the opening amount is larger than or equal to the predetermined amount, or when the airflow control valve 1A is completely opened, the gap G1 is formed between the airflow control valve 1A and the wall surface 3ba. Further, because the gap opening/closing portion 1aA is opened as shown in FIG. 1F, the intake airflow is appropriately guided to the gap G1.

When the airflow control valve 1A is completely closed as shown in FIG. 1B, or when the airflow control valve 1A is partly opened as shown in FIG. 1D, an engulfing airflow F2 is generated and directed toward the space between the lower surface 1cA of the airflow control valve 1A and the wall surface 3ba of the intake port 3. The intake air contains a small amount of oil and carbon. Therefore, the oil adheres to the lower surface 1cA and the wall surface 3ba due to the engulfing airflow F2. As a result, a deposit D made of carbon or the like is generated. In this situation, according to this embodiment, an airflow F3, which is guided to the gap G1, removes the deposit D when the airflow control valve 1A is partly opened such that the opening amount is larger than or equal to the predetermined amount, or when the airflow control valve 1A is completely opened as shown in FIG. 1E. As a result, the locking of the airflow control valve 1A can be avoided.

The position at which the valve shaft 2 is provided is not limited to the position described in this embodiment. For example, the valve shaft 2 may be provided at a position near the wall surface 3bb in the side view of the intake port 3. Also, for example, the wall surface 3ba and the gap opening/closing portion 1aA may be formed such that the gap G1 is formed when the airflow control valve 1A is completely closed or when the airflow control valve 1A is partly opened such that the opening amount is smaller than the predetermined amount, and the gap G1 is closed when the airflow control valve 1A is partly opened such that the opening amount is larger than or equal to the predetermined amount, or when the airflow control valve 1A is completely opened. When the airflow control valve 1A is completely closed or when the airflow control valve 1A is partly opened such that the opening amount is smaller than the predetermined amount, fuel may adhere to the wall surface 3$ba$ due to spit-back from the combustion chamber 4. Accordingly, by forming the gap G1 when the airflow control valve 1A is completely closed or when the airflow control valve 1A is partly opened such that the opening amount is smaller than the predetermined amount, the adherence of the fuel to the wall surface 3$ba$ can be appropriately avoided. Also, the gap G1 may be formed at least when the opening amount of the airflow control valve 1A is in a predetermined range. In this case, it is possible to determine the optimum range of the opening amount of the airflow control valve 1A in which the gap G1 is formed, considering all of the influence on the strength of the tumble flow generated in the combustion chamber 4, an intake-air charging efficiency, the effect of removing the deposit D, and the like. Also, for example, control may be executed to alternately switch the state of the airflow control valve 1A between the partly-opened state and the completely-opened state. By repeatedly opening/closing the gap G1, the flow amount and flow speed of intake air passing through the gap G1 can be changed. As a result, the deposit D can be removed more effectively. Thus, it is possible to realize the intake port structure 100A for an internal combustion engine, which avoids the locking of the airflow control valve 1A.

Figure 2:
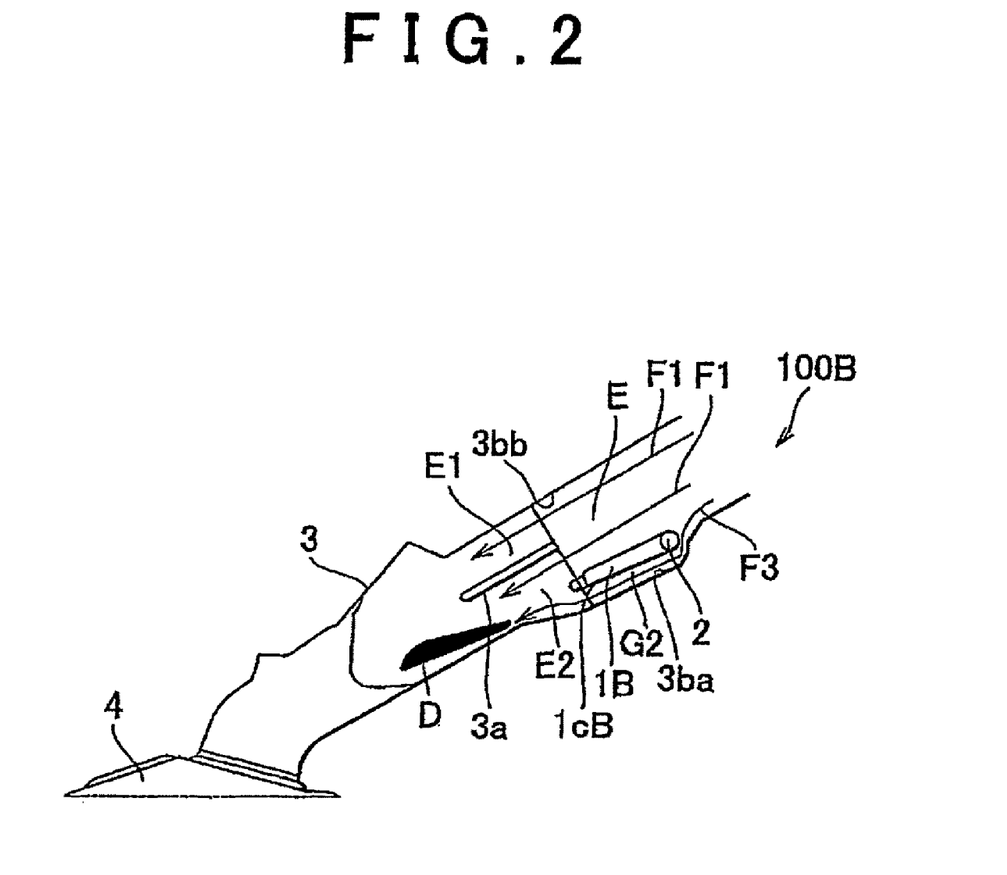
FIG. 2 shows the configuration of an intake port structure 100B according to a second embodiment, which includes an airflow control valve 1B whose one end is supported by a valve shaft 2.

An intake port structure 100B according to a second embodiment of the invention will be described in detail. The intake port structure 100B according to this embodiment includes an airflow control valve 1B whose one end is supported by the valve shaft 2. As shown in FIG. 2, the configuration of the intake port structure 100B according to the second embodiment is the same as that of the intake port structure 100A according to the first embodiment, except that the intake port structure 100B includes the airflow control valve 1B instead of the airflow control valve 1A. In this embodiment, because one end of the airflow control valve 1B is supported by the valve shaft 2, the airflow control valve 1B does not include the gap opening/closing portion 1$a$A, unlike the airflow control valve 1A.

In the intake port structure 100B according to this embodiment, a gap G2 is formed between the valve shaft 2 and the wall surface 3$ba$, irrespective of whether the airflow control valve 1B is opened or closed. Thus, in the intake port structure 100B according to this embodiment, oil and carbon that adhere to the lower surface 1$c$B of the airflow control valve 1B and the wall surface 3$ba$ can be removed by the intake air flowing through the gap G2. Even when the airflow control valve 1B is partly opened such that the opening amount is smaller than the predetermined amount or when the airflow control valve 1B is completely closed, the oil adhering to the lower surface 1$c$B and the wall surface 3$ba$ can be removed. By forming the gap G2 even when the airflow control valve 1B is completely closed as in this embodiment, the intake air more reliably contacts the lower surface 1$c$B and the wall surface 3$ba$. Therefore, the oil adhering to the lower surface 1$c$B and the wall surface 3$ba$ can be removed more appropriately. Thus, it is possible to realize the intake port structure 100B that avoids the locking of the airflow control valve 1B.

Figure 3A:
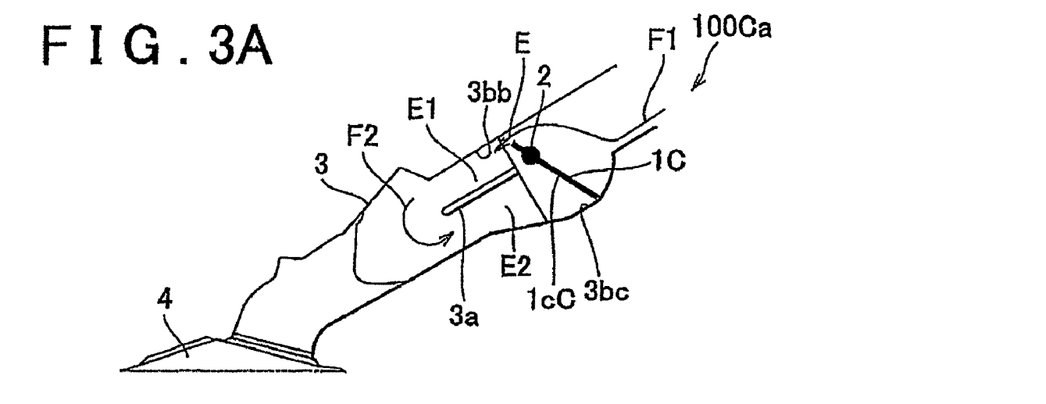
FIG. 3A to FIG. 3C show the configuration of an intake port structure 100Ca that includes an airflow control valve 1C in which an intermediate portion is supported by the valve shaft 2.
Figure 3B:
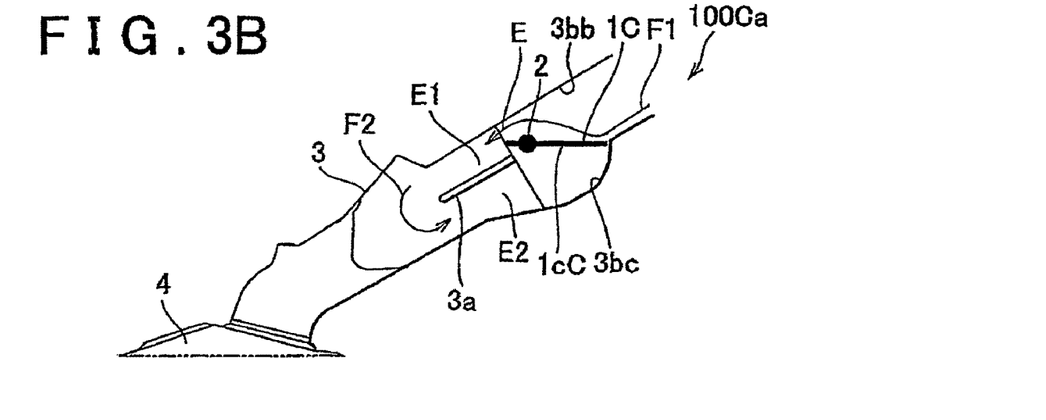
Figure 3C:
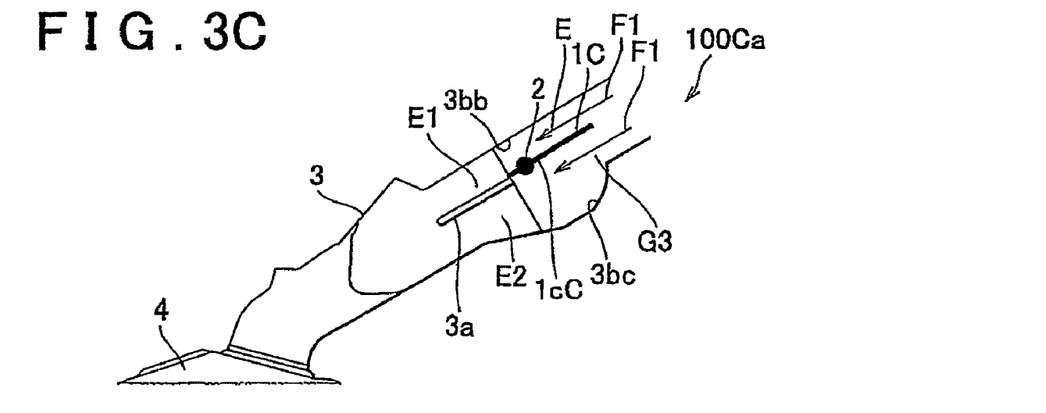

FIG. 3A to FIG. 3C shows the configuration of an intake port structure 100Ca according to a third embodiment of the invention. The intake port structure 100Ca according to the third embodiment of the invention includes an airflow control valve 1C in which an intermediate portion is supported by the valve shaft 2. More specifically, FIG. 3A shows that the airflow control valve 1C is completely closed. FIG. 3B shows that the airflow control valve 1C is partly opened. FIG. 3C shows that the airflow control valve 1C is completely opened. In the intake port structure 100Ca according to this embodiment, the valve shaft 2 is provided at a position that is sufficiently distant from wall surfaces 3$bb$ and 3$bc$. In the intake port structure 100Ca according to this embodiment, the shape of the wall surface 3$bc$ is formed such that the intake air does not flow through the area between the valve shaft 2 and the wall surface 3$bc$ when the airflow control valve 1C is completely closed or when the airflow control valve 1C is partly opened such that the opening amount is smaller than a predetermined amount. In this intake port structure 100Ca, the flow amount and the flow speed of the intake air can be increased/decreased by changing the state of the airflow control valve 1C among the completely-closed state, partly-opened state, and the completely-opened state, as in the intake port structure 100A according to the first embodiment and in the intake port structure 100B according to the second embodiment. The configuration of the intake port structure 100Ca according to this embodiment is the same as that of the intake port structure 100A according to the first embodiment, except that the airflow control valve 1C is different from the airflow control valve 1A, the position of the valve shaft 2 is different from the position of the valve shaft 2 in the first embodiment, and the shape of the wall surface 3$bc$ of the intake port 3 is different from the shape of the wall surface 3$ba$ of the intake port 3.

As shown in FIG. 3A, when the airflow control valve 1C according to this embodiment is completely closed, the airflow control valve 1C makes the passage E narrow, as in the case of the airflow control valve 1A in the first embodiment. Thus, the speed of the intake airflow F1 is increased, and the intake airflow F1 is deflected. As a result, the tumble flow can be generated in the combustion chamber 4. Also, as shown in FIG. 3B, when the airflow control valve 1C is partly opened, the airflow control valve 1C enlarges the passage E and continues to generate the tumble flow, as in the case of the airflow control valve 1A in the first embodiment. Also, when the airflow control valve 1C is completely closed or partly opened, the engulfing flow P2 is generated and the spit-back from the combustion chamber 4 occurs, as in the intake port structure 100A according to the first embodiment. Therefore, oil, fuel, and carbon adhere to the lower surface 1$c$C of the airflow control valve 1C and the wall surface 3$bc$ of the intake port 3.

As shown in FIG. 3C, when the airflow control valve 1C is completely opened, the airflow control valve 1C divides the space in the intake port 3 into the two passages, that is, the passage E and the gap G3. That is, the airflow control valve 1C enlarges the passage to the fullest extent. Thus, the flow amount of intake air can be increased when a high load is applied to the internal combustion engine and the engine speed is high. Further, in this embodiment, when the airflow control valve 1C is completely opened, the intake air flowing through the gap G3 contacts the lower surface 1$c$C and the wall surface 3$bc$. Therefore, it is possible to remove, for example, the oil adhering to the lower surface $c$C and the wall surface 3$bc$.

Figure 4:
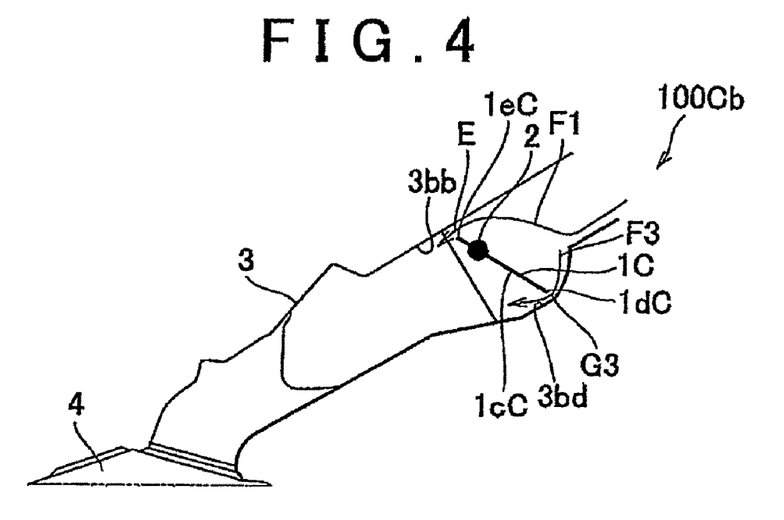
FIG. 4 shows the configuration of an intake port structure 100Cb that is the same as the intake port structure 100Ca except that a gap G3 is formed.

Further, the locking of the airflow control valve 1C can be avoided also in an intake port structure 100Cb in which a gap 3 is formed, as described below. FIG. 4 shows the configuration of the intake port structure 100Cb. The intake port structure 100Cb is the same as the intake port structure 100Ca, except that the gap G3 is formed. Although the intake port structure 100Cb does not include the partition wall 3a in the intake port 3 in this embodiment, the intake port structure 100Cb may include the partition wall 3a. As shown in FIG. 4, in the intake port structure 100Cb, when the airflow control valve 1C is completely closed or partly opened, the gap G3 is formed between one end portion 1dC of the airflow control valve 1C and the wall surface 3bd. Thus, when the airflow control valve 1C is completely closed or partly opened, the intake air flows through the gap G3, that is, the intake air flows along the wall surface 3bd. Therefore, it is possible to more appropriately remove, for example, the oil adhering to the wall surface 3bd. Further, the shape of the one end portion 1dC of the airflow control valve 1C may be formed such that the cross sectional area of a portion of the gap G3 at an upstream position is larger than the cross sectional area of a portion of the gap G3 at a downstream position. With this configuration, it is possible to more appropriately remove, for example, the oil adhering to the wall surface 3bd, by guiding the intake air to the gap G3.

The wall surface 3bd and the airflow control valve 1C may be formed such that the gap G3 is formed only when the opening amount of the airflow control valve 1C is in a predetermined range. For example, the gap G3 may be formed only when the airflow control valve 1C is completely closed, or only when the airflow control valve 1C is partly opened. Also, it is possible to employ, for example, an airflow control valve that does not include the other end portion, that is, the portion on the other side of the valve shaft 2, instead of the airflow control valve 1C, in the intake port structures shown in FIG. 3 and FIG. 4. In this case, however, when the airflow control valve is completely closed or partly opened, the cross sectional area of the passage E is constant, and therefore, the flow amount and flow speed of the intake air cannot be changed. Thus, it is possible to realize the intake port structure 100C that avoids the locking of the airflow control valve 1C.

Figure 5:
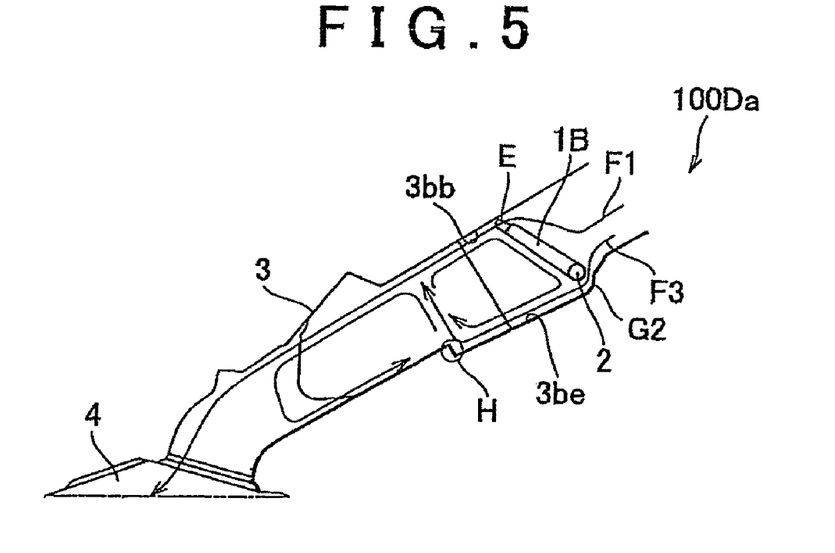
FIG. 5 shows the configuration of an intake port structure 100Da according to a fourth embodiment, which includes the airflow control valve 1B whose one end is supported by the valve shaft 2, like the intake port structure 100B according to the second embodiment, and which further includes an airflow guide portion H provided on a wall surface 3*be;*

An intake port structure 100Da according to a fourth embodiment will be described. The intake port structure 100Da according to the fourth embodiment is the same as the intake port structure 100B according to the second embodiment, except for the points described below. FIG. 5 shows the configuration of the intake port structure 100Da. The intake port structure 100Da includes the airflow control valve 1B whose one end is supported by the valve shaft 2, as in the intake port structure 100B according to the second embodiment shown in FIG. 5. Further, the intake port structure 100Da includes an airflow guide portion H provided on the wall surface 3be. In the intake port structure 100Da according to this embodiment, the airflow guide portion H is provided on the wall surface 3be adjacent to the gap G2 that is formed irrespective of whether the airflow control valve 1B is opened or closed, at a position downstream of the valve shaft 2, that is, a position between the valve shaft 2 and the combustion chamber 4. The airflow guide portion H guides the intake air, which has passed through the gap G2, toward the wall surface 3bb adjacent to the passage E. More specifically, in this embodiment, the airflow guide portion H is formed as a step portion of the wall surface 3be, as shown in FIG. 5. However, the shape of the airflow guide portion H is not limited to this shape. For example, the airflow guide portion H may have a cylindrical inner surface that can more smoothly guide the intake air that has passed through the gap G2 toward the wall surface 3bb. In the intake port structure 100 Da according to the embodiment, the intake port 3 does not include a partition.

When the airflow control valve 1B is closed, the intake airflow F1 passes through the passage E that has been made narrow. Therefore, the flow speed of the intake airflow F1 is increased, and the intake airflow F1 is deflected toward the wall surface 3bb. At this time, in this intake port structure 100Da according to this embodiment, the airflow guide portion H guides an intake airflow F3, which has passed through the gap G2, toward the wall surface 3bb. Then, the intake airflow F3, which is guided to the wall surface 3bb, is changed to a fountain-like airflow, as shown in FIG. 5. The fountain-like airflow pushes the airflow F1, which has passed through the passage E, upward toward the wall surface 3bb. Thus, it is possible to suppress the diffusion of the intake airflow F1 and a decrease in the flow speed of the intake air.

Figure 6A:
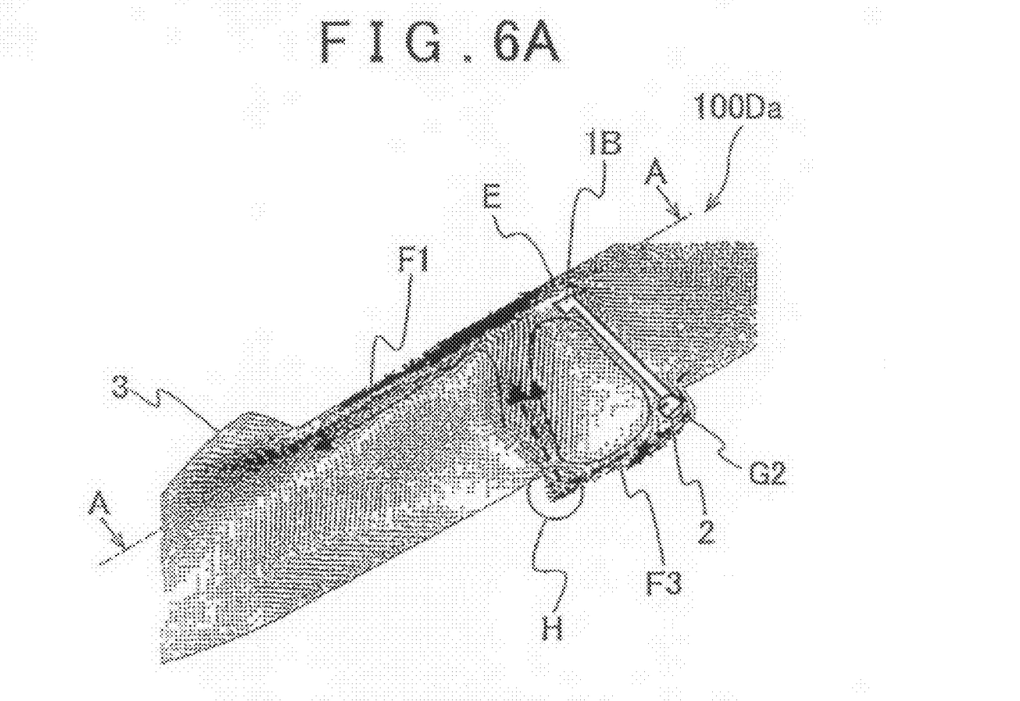
FIG. 6A and FIG. 6B show the movement of intake air in the intake port structure 100Da according to the fourth embodiment.
Figure 6B:
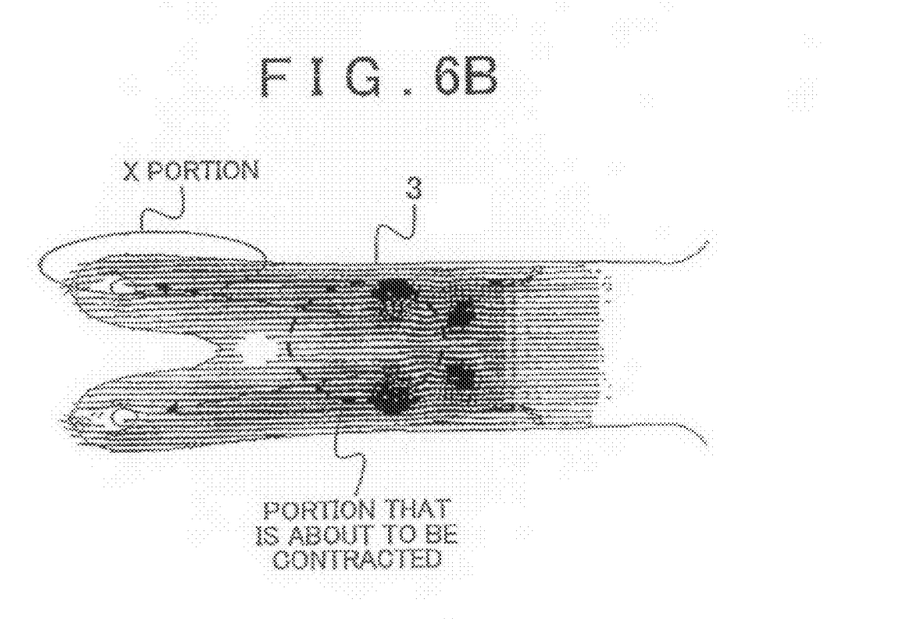

FIG. 6A and FIG. 6B show the movement of the intake air in the intake port structure 100Da according to this embodiment. More specifically, FIG. 6A shows the distribution of the flow speed of an intake airflow F in the intake port 3 when the intake air flows into the intake port structure 100Da. FIG. 6B is a sectional view of the intake port structure 100Da taken along line A-A, which is similar to the sectional view taken along line A-A in FIG. 9C. As shown in FIG. 6A, in the intake port structure 100Da according to this embodiment, the diffusion of the intake airflow F1 is suppressed, as compared to the intake port structure 200 shown in FIG. 9A. As a result, the intake airflow F1 is kept deflected. Thus, a decrease in the flow speed of the intake air can be suppressed. As a result, a decrease in the strength of the tumble flow generated in the combustion chamber 4 can be suppressed. In the case where the intake airflow F1 is kept deflected by injecting assist air in the direction opposite to the direction of the intake airflow F1, the intake airflow F1 is attenuated by the assist air. However, in the intake port structure 100Da according to this embodiment, when the intake airflow F1 is about to be diffused, the intake airflow F1 is kept deflected by pushing the intake airflow F1 upward. Therefore, the attenuation of the intake airflow F1 is suppressed. As a result, it is possible to appropriately increase the strength of the tumble flow generated in the combustion chamber 4.

As shown in FIG. 6B, in the intake air port structure 100Da according to this embodiment, the portion of the intake airflow F1, which is about to be contracted, is pushed upward by the intake airflow F3. As a result, the contraction of the portion of the intake airflow F1 is suppressed. As a result, the intake air also flows through the X portion. Therefore, the adherence of the fuel to an intake valve can be suppressed, and an air-fuel mixture can be generated using the fuel. This suppresses deterioration of fuel efficiency of the internal combustion engine, and reduces emissions. The fountain-like airflow shown in FIG. 6A and FIG. 6B also suppresses the generation of the engulfing airflow F2 shown in FIG. 1. Therefore, the generation of the deposit can be suppressed not only by the effect of the intake airflow F3 passing through the gap G2, but also by the effect of this fountain-like airflow. Thus, the locking of the airflow control valve 1B can be avoided. As a result of experiment, it has been confirmed that the strength of the tumble flow is increased by approximately 20% in the intake port structure 100Da according to this embodiment, as compared to the intake port structure 200 shown in FIG. 9, although the strength of the tumble flow varies depending on the opening amount of the airflow control valve 1B.

Figure 7:
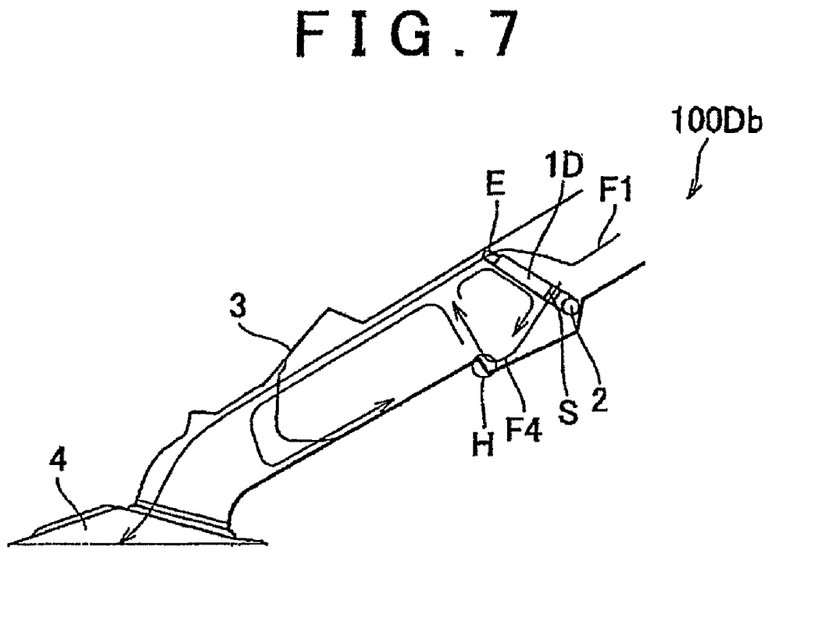
FIG. 7 shows the configuration of an intake port structure 100Db that is the same as the intake port structure 100Da except that an airflow control valve 1D is provided instead of the airflow control valve 1B, and a gap G2 is not formed.

In an intake port structure 100Db as well, the strength of the tumble flow can be more appropriately increased while the intake airflow F1 is kept deflected. The intake port structure 100Db is the same as the intake port structure 100Da, except that an airflow control valve 1D is provided instead of the airflow control valve 1B, and the gap G2 is not formed. FIG. 7 shows the configuration of the intake port structure 100Db in which the airflow control valve 1D is provided, instead of the airflow control valve 1B, and the gap G2 is not formed. In the intake port structure 100Db shown in FIG. 7, a hole S having a slit shape is formed in the airflow control valve 1D, instead of forming the gap G2. The hole S extends in the direction perpendicular to the surface of paper on which FIG. 7 is printed. As shown in FIG. 7, the hole S is formed such that an intake airflow F4 is directed toward the airflow guide portion H when the airflow control valve 1D is closed. Thus, in the intake port structure 100Db according to this embodiment, the intake airflow F1 is pushed upward as in the intake port structure 100Da. That is, in the intake port structure 100Db according to this embodiment as well, the strength of the tumble flow can be appropriately increased while the intake airflow F1 is kept deflected. Also, the contraction of the intake airflow F1 can be similarly suppressed. This suppresses the deterioration of the fuel efficiency of the internal combustion engine, and reduces the emissions. Further, the generation of the engulfing flow F2 shown in FIG. 1 can be similarly suppressed. Therefore, the generation of the deposit can be suppressed, and the locking of the airflow control valve 1D can be avoided.

Figure 8:
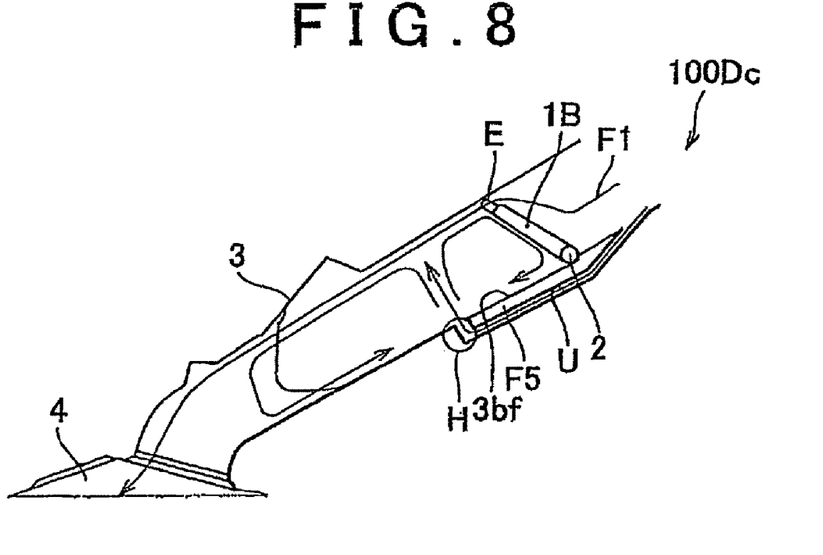
FIG. 8 shows the configuration of an intake port structure 100Dc which includes the airflow control valve 1B like the intake port structure 100Da, and in which a communication passage U extending from a position upstream of the airflow control valve 1B to a position downstream of the airflow control valve 1B is formed on the side of a wall surface 3*bf* that is near the valve shaft 2.

In an intake port structure 100Dc described below as well, the strength of the tumble flow can be appropriately increased while the intake airflow F1 is kept deflected. FIG. 8 shows the configuration of the intake port structure 100Dc. The intake port structure 100Dc includes the airflow control valve 1B, as in the intake port structure 100Da. Further, a communication passage U is formed on the side of a wall surface 3bf that is near the valve shaft 2, instead of forming the gap G2. The communication passage U extends from a position upstream of the airflow control valve 1B to a position downstream of the airflow control valve 1B. As shown in FIG. 8, by forming the communication passage U instead of forming the gap G2, an intake airflow F5 that has passed through the communication passage U is changed to the fountain-like airflow by the airflow guide portion H. Thus, the intake airflow F1 is pushed upward as in the intake port structures 100Da and 100Db. As a result, the strength of the tumble flow can be more appropriately increased. Also, in the intake port structure 100Dc as well, the contraction of the intake airflow F1 can be suppressed. This suppresses the deterioration of the fuel efficiency of the internal combustion engine, and reduces the emissions. Further, in the intake port structure 100Dc as well, the generation of the engulfing airflow F2 shown in FIG. 1 can be suppressed. Therefore, the generation of the deposit can be suppressed, and the locking of the airflow control valve 1B can be avoided. Thus, it is possible to realize the intake port structure 100D which avoids the locking of the airflow control valve 1B or 1C, which appropriately increases the strength of the tumble flow generated in the combustion chamber 4 using the intake airflow F1, and which suppresses the deterioration of the fuel efficiency of the internal combustion engine, and reduces the emissions.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. An intake port structure for an internal combustion engine, comprising:
   a valve shaft provided in an intake port; and
   an airflow control valve that is supported by the valve shaft at one end of the airflow control valve,
   wherein:
   regardless of the opening state of the airflow control valve, a gap is formed between the one end of the airflow control valve and a wall surface of the intake port, and
   the valve shaft is provided at a position lower than an axis of the intake port in a side view of the intake port.

2. An intake port structure for an internal combustion engine, comprising:
   a valve shaft provided in an intake port; and
   an airflow control valve supported by the valve shaft at one end of the airflow control valve,
   wherein:
   when the airflow control valve is opened, a passage is formed between the airflow control valve and a portion of the wall surface of the intake port, which is positioned on one side of the valve shaft;
   one end of the airflow control valve contacts another portion of the wall surface of the intake port, which is opposite to the portion of the wall surface adjacent to the passage; and
   a hole, through which intake air passes, is formed in the airflow control valve, thereby allowing a portion of intake air to pass through the control valve even when the valve is closed;
   an airflow guide portion is provided on the portion of the wall surface, which is opposite to the portion of the wall surface adjacent to the passage; and
   the airflow guide portion guides the intake air, which has passed through the hole, toward the portion of the wall surface adjacent to the passage.

3. An intake port structure for an internal combustion engine, comprising:
   a valve shaft provided in an intake port; and
   an airflow control valve that is supported by the valve shaft at a position near one end of the airflow control valve and is bent at a position supported by the valve shaft, the airflow control valve having a valve element portion and a gap opening/closing portion,
   wherein:
   when the airflow control valve is opened, a passage is formed between the valve element portion of the airflow control valve and a portion of a wall surface of the intake port, which is positioned on one side of the valve shaft; and
   regardless of the opening state of the airflow control valve, a gap is formed between the gap opening/closing portion of the airflow control valve and another portion of the wall surface of the intake port, which is opposite to the portion of the wall surface adjacent to the passage.

4. The intake port structure for an internal combustion engine according to claim 3, wherein the valve shaft is provided at a position lower than an axis of the intake port in a side view of the intake port.

5. The intake port structure for an internal combustion engine according to claim 3, wherein the gap is formed when the opening amount of the airflow control valve is larger than or equal to a predetermined amount, and the gap is closed when the opening amount is smaller than the predetermined amount.

6. The intake port structure for an internal combustion engine according to claim 3, wherein the gap is closed when the opening amount of the airflow control valve is larger than or equal to a predetermined amount, and the gap is formed when the opening amount is smaller than the predetermined amount.

7. The intake port structure for an internal combustion engine according to claim 3, wherein the gap is formed when the opening amount of the airflow control valve is in a predetermined range.

8. The intake port structure for an internal combustion engine according to claim 3, wherein an end portion of the airflow control valve is formed such that a cross-sectional area of a portion of the gap at an upstream position in a direction in which intake air flows is larger than a cross-sectional area of a portion of the gap at a downstream position in the direction in which intake air flows.

9. The intake port structure for an internal combustion engine according to claim 3, wherein
   an airflow guide portion is provided on the portion of the wall surface adjacent to the gap, at a position downstream of the airflow control valve; and
   the airflow guide portion guides intake air, which has passed through the gap, toward the portion of the wall surface adjacent to the passage.

* * * * *

UNITED STATES PATENT AND TRADEMARK OFFICE
CERTIFICATE OF CORRECTION

PATENT NO. : 7,900,595 B2
APPLICATION NO. : 11/991530
DATED : March 8, 2011
INVENTOR(S) : Kazuyoshi Abe et al.

It is certified that error appears in the above-identified patent and that said Letters Patent is hereby corrected as shown below:

| Column | Line | |
|---|---|---|
| 3 | 18 | Change "intake airflow P" to --intake airflow F--. |
| 6 | 66 | Change "intake port structure 10A" to --intake port structure 100A--. |
| 8 | 34 | Change "passage B" to --passage E--. |
| 10 | 47 | Change "engulfing flow P2" to --engulfing flow F2--. |

Signed and Sealed this
Twenty-seventh Day of September, 2011

David J. Kappos
*Director of the United States Patent and Trademark Office*